(12) United States Patent
Beck et al.

(10) Patent No.: US 8,253,064 B2
(45) Date of Patent: Aug. 28, 2012

(54) PROGRESSIVE LASER BLANKING DEVICE FOR HIGH SPEED CUTTING

(75) Inventors: Kim Beck, Toledo, OH (US); Kurt McMurtrie, Defiance, OH (US); Richard A. Marando, Mohrsville, PA (US)

(73) Assignee: Automatic Feed Company, Napoleon, OH (US)

( * ) Notice: Subject to any disclaimer, the term of this patent is extended or adjusted under 35 U.S.C. 154(b) by 636 days.

(21) Appl. No.: 12/389,655

(22) Filed: Feb. 20, 2009

(65) Prior Publication Data

US 2009/0212033 A1 Aug. 27, 2009

Related U.S. Application Data

(60) Provisional application No. 61/066,369, filed on Feb. 20, 2008, provisional application No. 61/066,601, filed on Feb. 21, 2008.

(51) Int. Cl.
*B23K 26/10* (2006.01)
*B23K 26/38* (2006.01)
(52) U.S. Cl. .................. 219/121.67; 219/121.72
(58) Field of Classification Search ............ 219/121.6, 219/121.72, 121.44, 121.67, 121.66, 121.82, 219/121.69, 121.58
See application file for complete search history.

(56) References Cited

U.S. PATENT DOCUMENTS

| | | | | |
|---|---|---|---|---|
| 3,991,926 A | * | 11/1976 | Marks | ............................ 227/21 |
| 4,328,726 A | * | 5/1982 | Pearl | ................................. 83/39 |
| 4,718,541 A | | 1/1988 | Wilding | |
| 5,182,428 A | * | 1/1993 | Jack et al. | ................ 219/121.63 |
| 5,436,423 A | | 7/1995 | Welty | |
| 5,648,002 A | * | 7/1997 | Omote | ..................... 219/121.82 |

(Continued)

FOREIGN PATENT DOCUMENTS

JP  03094990 A  *  4/1991

OTHER PUBLICATIONS

Design for Laserfacturing, Charles Caristan (Air Liquide), Taylan Altan, Serhat Kaya (the Ohio State University), (Nov. 7-8, 2007), pp. 1-10.

(Continued)

*Primary Examiner* — Henry Yuen
*Assistant Examiner* — Thien S Tran
(74) *Attorney, Agent, or Firm* — Harness, Dickey & Pierce, P.L.C.

(57) ABSTRACT

A laser blanking device for high speed cutting of a rapidly fed strip of coil stock is disclosed and includes a support frame extending along a first longitudinal axis and a conveyor supported by the support frame. A strip of coil stock material is fed onto the conveyor at a pinch roll located near a first end of the frame. Transverse, moveable gantries above the conveyor suspend lasers. A pinch roll located near a second end of the frame assists movement of the material. Multiple laser cutting operations are simultaneously performed on the material as it moves along the device, and a laser head suspended from a gantry situated after the second pinch roll completes a cut that separates a blank from the remainder of the stock material.

19 Claims, 11 Drawing Sheets

U.S. PATENT DOCUMENTS

| | | | |
|---|---|---|---|
| 5,994,665 A * | 11/1999 | Nishibayashi et al. | 219/121.64 |
| 6,191,382 B1 | 2/2001 | Damikolas | |
| 6,333,482 B1 * | 12/2001 | Sauer et al. | 219/121.63 |
| 6,365,870 B1 * | 4/2002 | Petring et al. | 219/121.67 |
| 6,520,057 B1 * | 2/2003 | Steadman | 83/76.8 |
| 6,563,081 B2 | 5/2003 | Pace | |
| 7,148,446 B2 | 12/2006 | Harnisch et al. | |
| 7,154,530 B2 * | 12/2006 | Andrews et al. | 348/86 |
| 2004/0108305 A1 * | 6/2004 | Harnisch et al. | 219/121.72 |
| 2006/0118529 A1 * | 6/2006 | Aoki et al. | 219/121.67 |

OTHER PUBLICATIONS

Laser Blanking: Keeping Up with Multi-Model Production Needs, Dr. J.C. Mombo-Caristan, www.sme.org/forming&fabricating (Aug. 2000) pp. 46-54.

Design With Lasers in Mind, Charles Caristan, Gulam Mohiuddin, Mariana Forrest, and Nasim Uddin, Industrial Laser Solutions, www.industrial-lasers.com (Jun. 2007) pp. 35-39.

International Search Report for International Application No. PCT/US2009/034634, Apr. 9, 2009.

* cited by examiner

PROGRESSIVE LASER BLANKING DEVICE FOR HIGH SPEED CUTTING

The present application claims priority from both Provisional Application No. 61/066,369, filed Feb. 20, 2008, and Provisional Application No. 61/066,601, filed Feb. 21, 2008, both of which are incorporated by reference herein.

BACKGROUND OF THE DISCLOSURE

The present disclosure relates generally to a progressive laser blanking device for high speed cutting of material and, more specifically, to a device that utilizes synchronized laser cutting operations along multiple axes and on a continuously moving strip of material.

Existing press-based mechanical blanking systems perform material cutting operations on flat, stationary sections of strips of material positioned underneath a press. Typically, a strip of material unreels from a coil stock, and the strip is straightened as it is fed into an automatic feeder. The feeder feeds the strip to a belt conveyor, which then moves the strip along the belt until it is situated directly beneath the mechanical press. Movement of the belt conveyor is then suspended until the mechanical press can cut a blank or a cut-out from the strip material.

Production rates are dependent upon the collective time it takes to continually suspend and restart conveyor movement so that the mechanical press can cut from the different portions of the strip; namely, each component of the entire system, such as, for example, the conveyor, the mechanical press, and the off-line robotic systems, etc., perform their respective operations consecutively.

The production rate of an existing press-based feeder system can basically be measured as the time it takes to cut out blanks from an entire coil stock. This system is inefficient due to the repeated start-and-stop operations of the conveyor; hence, there exists a need to eliminate the starting and stopping interruptions to the process. More specifically, there exists a need to perform laser cutting operations in one continuous phase, such that successive cutting-operations are capable of being performed repeatedly on a continuously moving strip of material.

The present disclosure is directed towards a laser blanking system that overcomes the foregoing inefficiencies and others while providing more advantageous results. Specifically, the laser blanking system includes a plurality of moving components which simultaneously perform cutting and blanking operations on a rapidly and continuously moving strip of material, thus eliminating or minimizing disruptions to the cutting and blanking process.

BRIEF DESCRIPTION OF THE DISCLOSURE

The present disclosure is directed towards a progressive laser blanking device that utilizes synchronized laser cutting operations on a continuously moving strip of material from a coil stock.

According to one aspect of the disclosure, the laser blanking device includes a stationary conveyor support frame, extending along a longitudinal axis between opposing first and second ends of the device, and a moveable, continuous pin conveyor traveling along the longitudinal axis of the device. At least two moveable gantries are supported on opposite sides of the device above the pin conveyor. Each of the at least two gantries is capable of moving along at least a limited portion of the longitudinal axis of the device. Each length of movement of each gantry is associated with a cutting stage, also referred to as a "cell." At least one moveable laser head is suspended on each gantry. Each of the laser heads is capable of reciprocal movement along its corresponding gantry in a direction parallel to or transverse to the longitudinal axis of the device. Multiple laser heads can be suspended on each gantry.

The laser blanking device further includes at least two sets of pinch rollers. A first pair of opposed pinch rollers is positioned adjacent to the first end of the conveyor support frame between the coil stock and the pin conveyor. A second pair of opposed pinch rollers is positioned adjacent to a second end of the conveyor support frame between the pin conveyor and auxiliary equipment. The pinch rollers primarily perform dual functions: (1) they support an underside of the strip to prevent sagging of the strip; and, (2) they feed the strip through the device at a velocity substantially equal to the velocity of the moving pin conveyor.

In accordance with another aspect of the disclosure, the laser blanking device includes an entry pinch roll assembly positioned at a first end of a longitudinally extending conveyor support frame and a second or exit pinch roll assembly positioned at a second, opposite end of the conveyor support frame. A pair of pinch rollers cooperates with each pinch roll assembly to capture and to apply tension to a moving strip of coil stock material traveling between the rollers. Each pinch roller rotates at a velocity substantially equal to the velocity of the traveling pin conveyor. Each pinch roller continuously feeds the moving strip along the longitudinal axis of the conveyor while at least one gantry-supported laser head interposed between the pinch roll assemblies moves along one of multiple axes transverse to or parallel to the longitudinal axis of the device to progressively cut at least a portion of a blank from the moving strip. A second or subsequent laser head positioned downstream from the second pinch roll assembly separates the blank from the strip.

A method of progressive laser blanking for high speed cutting of rapidly fed coil stock material includes at least the steps of (1) feeding a strip of material from a coil line into an entry pinch roll assembly at a first end of a conveyor; (2) feeding the strip of material along the conveyor to a second or exit pinch roll assembly at a second, opposed end of the conveyor; (3) applying tension to the strip by feeding it between a pair of opposed pinch rollers at each pinch roll assembly; (4) downloading computer-aided-design data into an associated control system to calculate and to command a synchronized sequence and motion profile of the pinch rollers, gantries, laser heads, and the conveyor of the laser blanking device; and, (5) continually moving the strip along the conveyor while the laser head(s) progressively cut from the moving strip. A final stage includes a laser cutting operation performed on the strip to cut or to part or to completely separate a blank from the strip after it passes the second pinch roll assembly.

One aspect of the present disclosure is to increase production rates by minimizing or eliminating the stationary periods present in existing systems. Another aspect of the present disclosure is to maximize performance of production lines at all phases, but particularly the laser cutting phases, by increasing the speed of the cutting operation of rapidly fed coil stock.

Other aspects of the disclosure will become apparent upon a reading and understanding of the following detailed description.

DETAILED DESCRIPTION OF THE DISCLOSURE

For purposes of this disclosure, the terms "blank" and "developed blank" mean a final product or a finished part formed from the strip of coil stock. A developed blank may comprise a simple profile, or it may include complex contours and holes formed there through. To achieve the final shape of the blank, the material removed from any holes is moved away from the strip. This removed material is referred to herein as "cut-out", "scrap", or "all-fall".

As used herein for purposes of enablement, the term "perimeter" designates the profile shape being cut. For purposes of enablement, a "perimeter portion" is not assigned solely to an entire perimeter of the developed blank or scrap part; rather; the term "perimeter portion" used herein refers to the partial or complete profile aimed to be cut by any one specific laser. This profile can be part of an outer circumference of the (developed or scrap) part, which mainly designates a total outer-shape of the part. The perimeter can also designate an outer circumference of a hole (scrap) shape which is cut for removal from in an inner cross-sectional area of the aimed developed blank.

In accordance with a preferred embodiment of the present disclosure, referring to FIGS. 1-4, a progressive laser blanking device 10 (hereinafter synonymously referred to as the "conveyor system", the "laser cutting device", the "laser cutting system", and the "laser blanking system") for high speed cutting operations is shown. Specifically, the laser cutting operations are performed to cut and to separate blanks from a rapidly fed strip of coil stock material. The present disclosure is contemplated for use with various metal materials; however, there are various types of material that may also be fed through the device. The methods disclosed herein are capable of also being performed on flat strips of other materials, such as, aluminum, plastic, plywood, epoxies, papers, and glass, etc., or any other coiled material that can be cut by a laser.

The laser blanking device 10 is part of a multiple-station production line such that it works in conjunction with other auxiliary equipment at opposite ends of the laser blanking device, such as, for example, coil processing equipment, welding equipment, off-line robots, transfer and stacking equipment, and any other equipment that processes material before it enters or after it exits a conveyor system, etc; namely, entry and exit equipment can be customized to a given production line. Examples of such entry equipment include straighteners 600 (FIG. 4), peeler tables 700, hold-down equipment 800, and crop shear pinch rolls 900 on crop shears 950 (FIG. 3).

Figure 1:
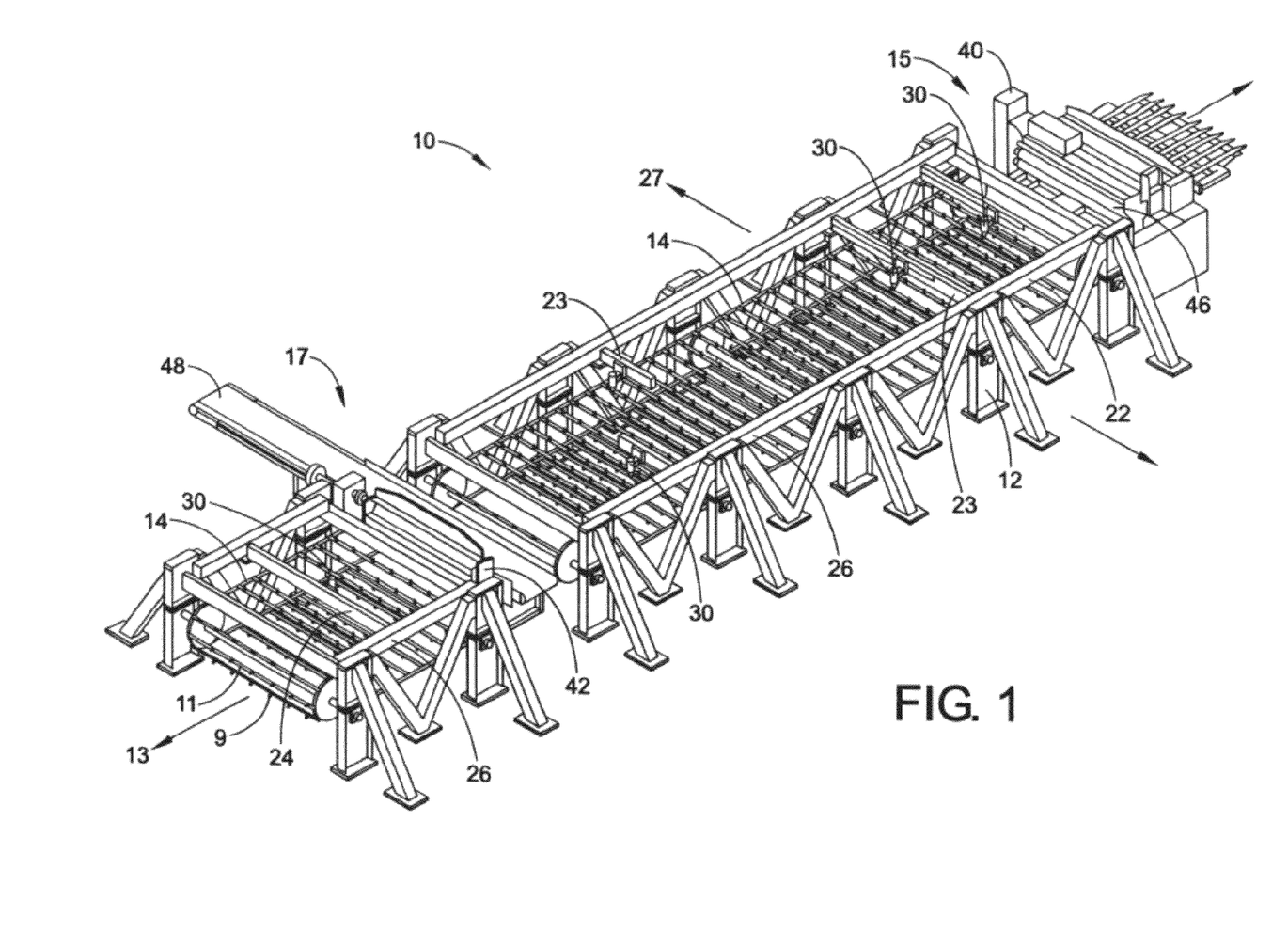
FIG. 1 is a perspective view of a progressive laser blanking device for high speed cutting of rapidly fed coil stock in accordance with a preferred embodiment of the disclosure.
Figure 2:
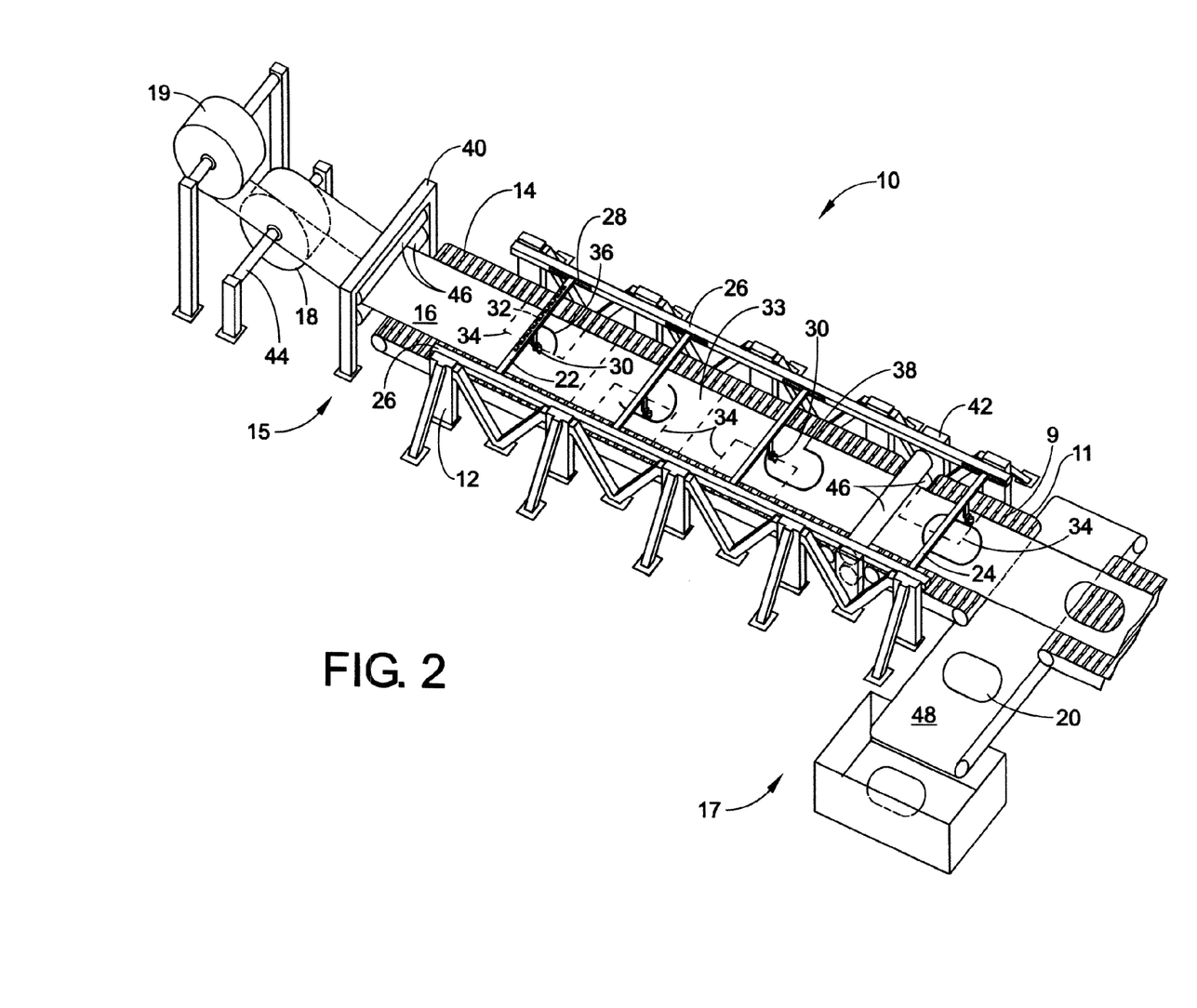
FIG. 2 is a perspective view of the progressive laser blanking device sequentially laser cutting a cut-out from a strip of coil stock traveling thereon.

FIG. 1 shows a conveyer support frame 12, which includes support legs and a gantry frame, extending along a longitudinal axis 13 of the conveyor, between a first end 15 and a second, opposed end 17 of the frame 12. At least one moveable pin conveyor 14 forms a continuous loop between the first and second ends 15, 17 along the longitudinal axis 13; namely, movement of the pin conveyor 14 supports and assists a continuous strip 16 of material fed from a coil stock 18 (FIG. 2). Referring to FIG. 1, two coils 18, 19 of materials are offset from each other to form a single coil which includes two side-by-side welded strips, which may be of different gauges and thickness of material. That is, the resulting strip can have different thickness portions for different blanks. One aspect of the present conveyor system 10 is that the pin conveyor 14 neither ceases nor recommences movement between laser cuttings of multiple blanks. That is, the pin conveyor 14 continuously moves throughout the cutting operation. The present system cuts and removes cut-outs 20 (FIG. 2), 220, 221 (FIG. 3) and cuts and produces blanks 200 (FIG. 3) from the strip 16 while the strip continuously moves; the work performed on any one section of the strip 16 can be divided between multiple lasers. The multiple lasers similarly allow for numerous sections of the strip 16 to be worked on simultaneously.

Figure 4:
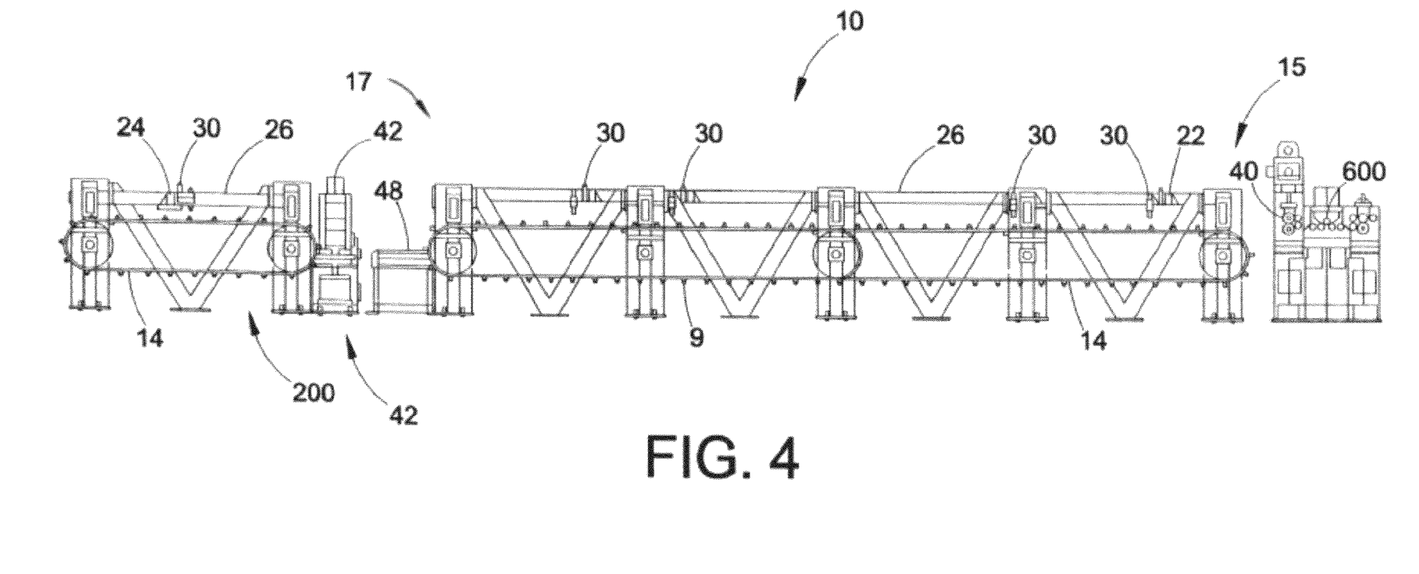
FIG. 4 is a side view of the laser blanking device shown in FIG. 1.
Figure 9:
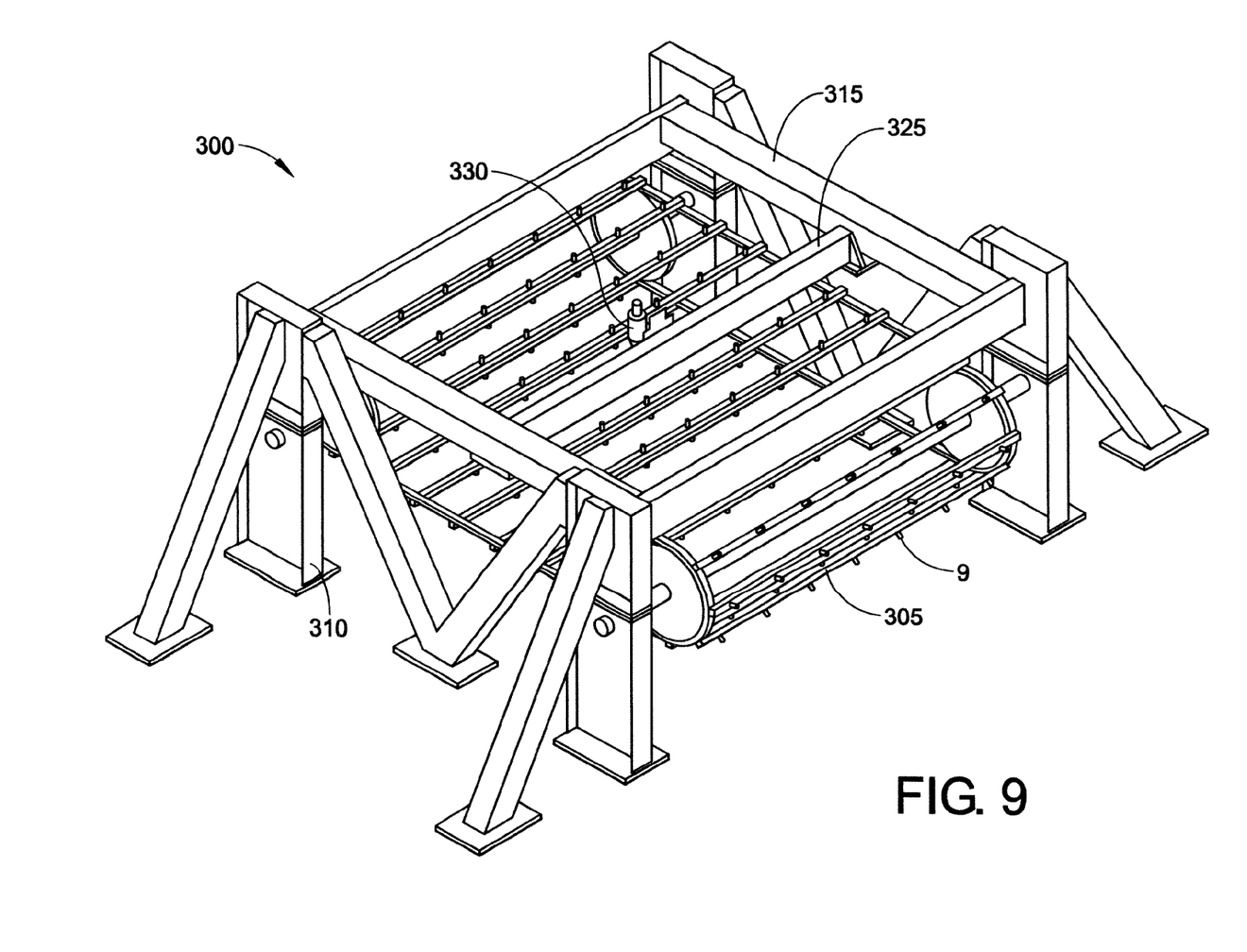
FIG. 9 is a perspective view of a cell for a progressive laser blanking device in accordance with an alternate embodiment of the disclosure.
Figure 10:
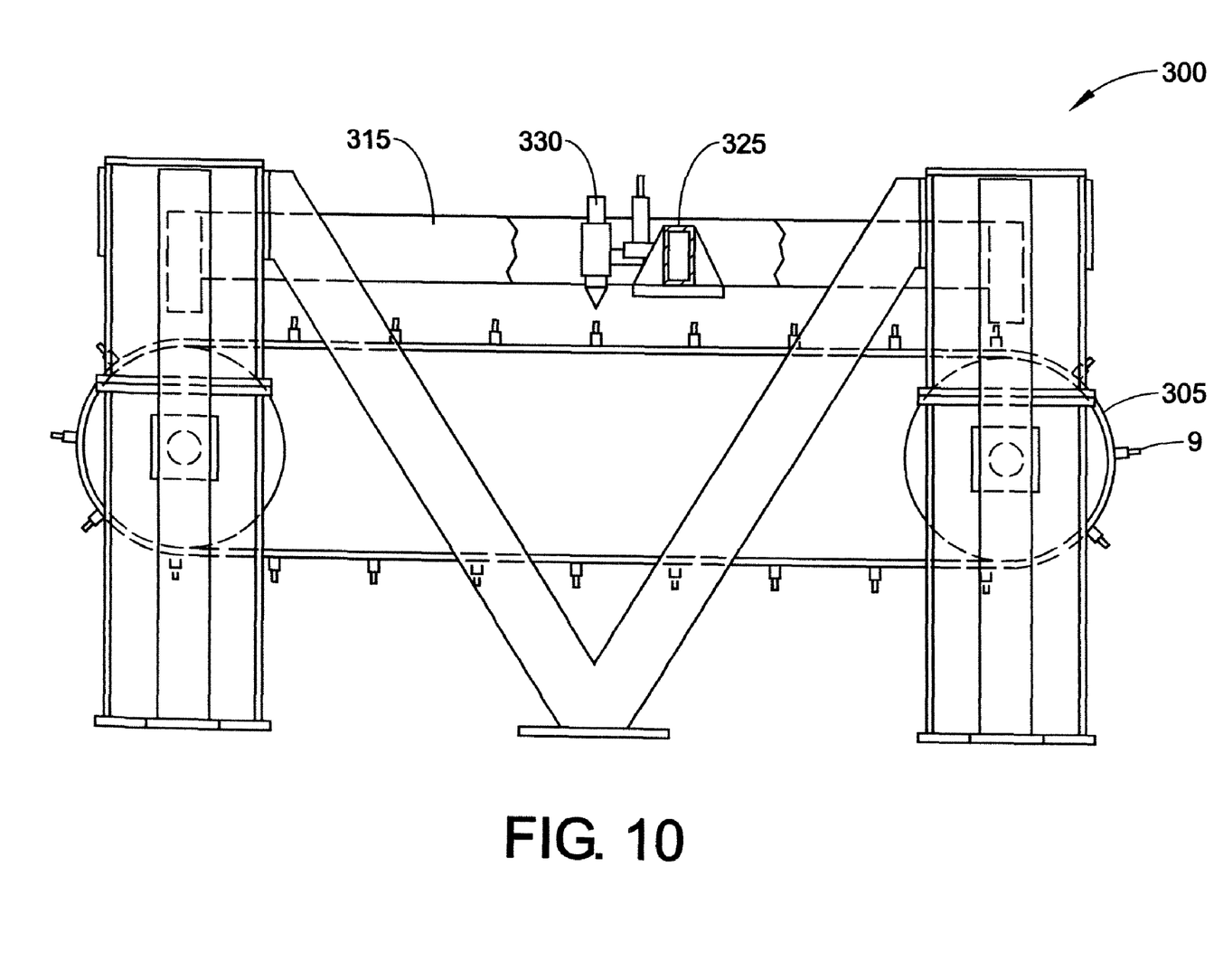
FIG. 10 is a side view of the subassembly shown in FIG. 9.

The pin conveyor 14 includes a plurality of spaced pin slabs 11 (shown also in FIGS. 4, 9 and 10). Each pin slab 11 includes a row of evenly spaced and upward facing pins 9, which support the stock while it moves so that the material doesn't drag through the system. The terminal ends of each pin slab 11 are capable of simple securement to opposing belts, which both rotate about moveable pulleys of the pin conveyor 14. The most preferred means of securement is attachment clips. Each pin slab 11 is furthermore capable of simple detachment. It is anticipated that the lasers can nick or possibly damage the pins of the pin slab 11 over a period of time; hence, the pin conveyor 14 is capable of repeated, individual pin slab 11 replacements.

Figure 3:
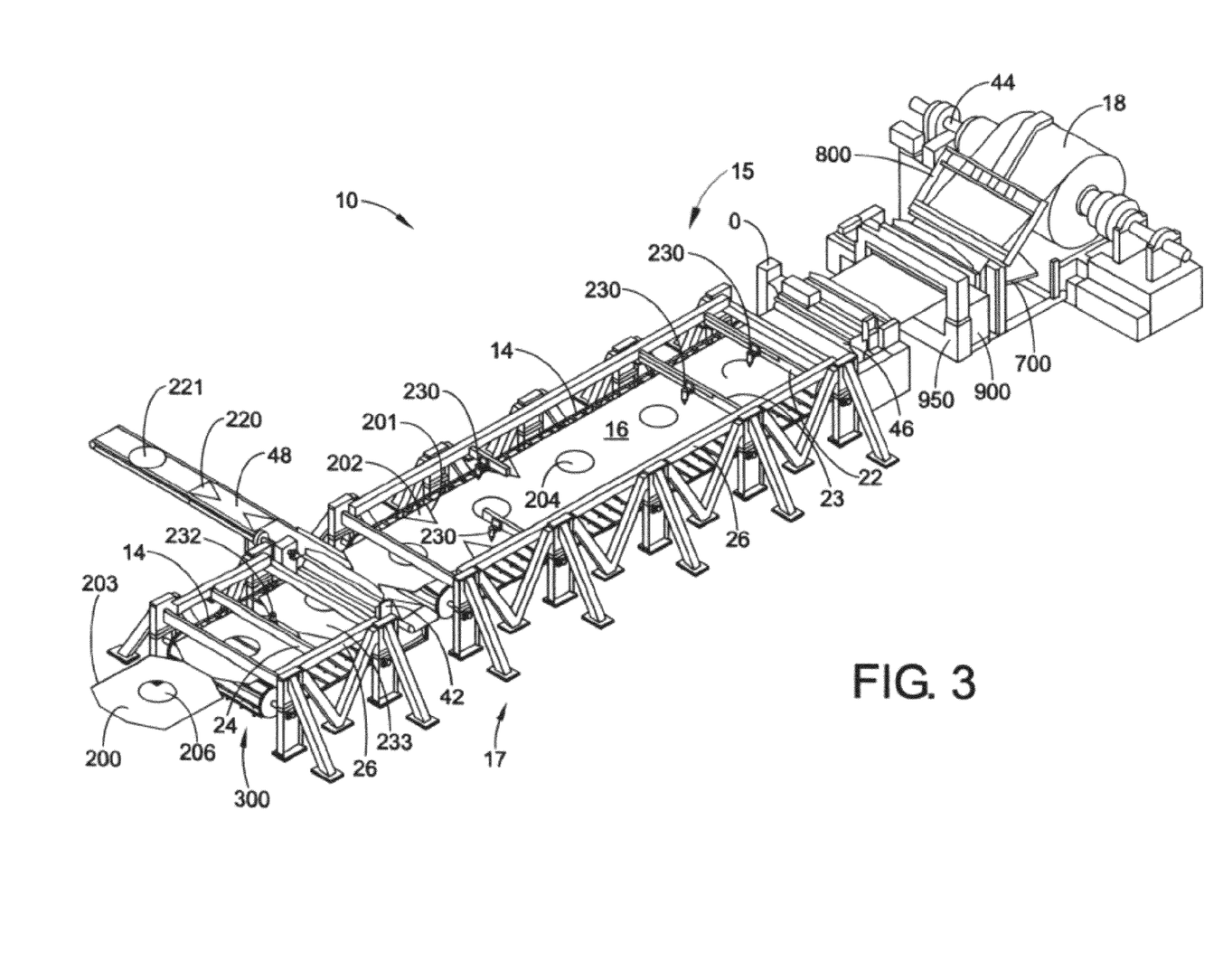
FIG. 3 is another perspective view of the progressive laser blanking device sequentially laser cutting a blank from a strip of coil strip traveling thereon.

FIGS. 2 and 3 show the strip 16 passing through the device, wherein cut-outs 20, 220, 221 and developed blanks 200 (such as, for example, door panels, trunk lids, body sides, hoods, etc.) are cut and subsequently removed from the strip 16 in a number of stages. At least two moveable gantries 22, 24 (hereinafter synonymously referred to as "robots" or "gimbals") are supported above the pin conveyor 14. The gantries 22, 24 are shown to extend from one of or between two opposed, elevated, horizontal parallel supports 26 of the conveyor support frame 12; however, other means for supporting the gantries 22, 24 above the moving strip 16 are also contemplated by the disclosure. Each of the gantries 22, 24 is capable of reciprocally moving back and forth along at least a limited length of the longitudinal axis 13. Each gantry 22, 24 and its corresponding limited length are associated with one "cell," i.e., one of the stages of the laser cutting. The limited length of movement of the gantries 22, 24 is achieved by means of a gantry groove or channel 28 formed along an inner surface (FIGS. 2 and 7) or an undersurface (FIGS. 1, 3, and 9) of each of the horizontal supports 26; namely, wheels or similar supports on the gantries 22, 24 are received in and travel along the gantry channels 28.

Figure 7:
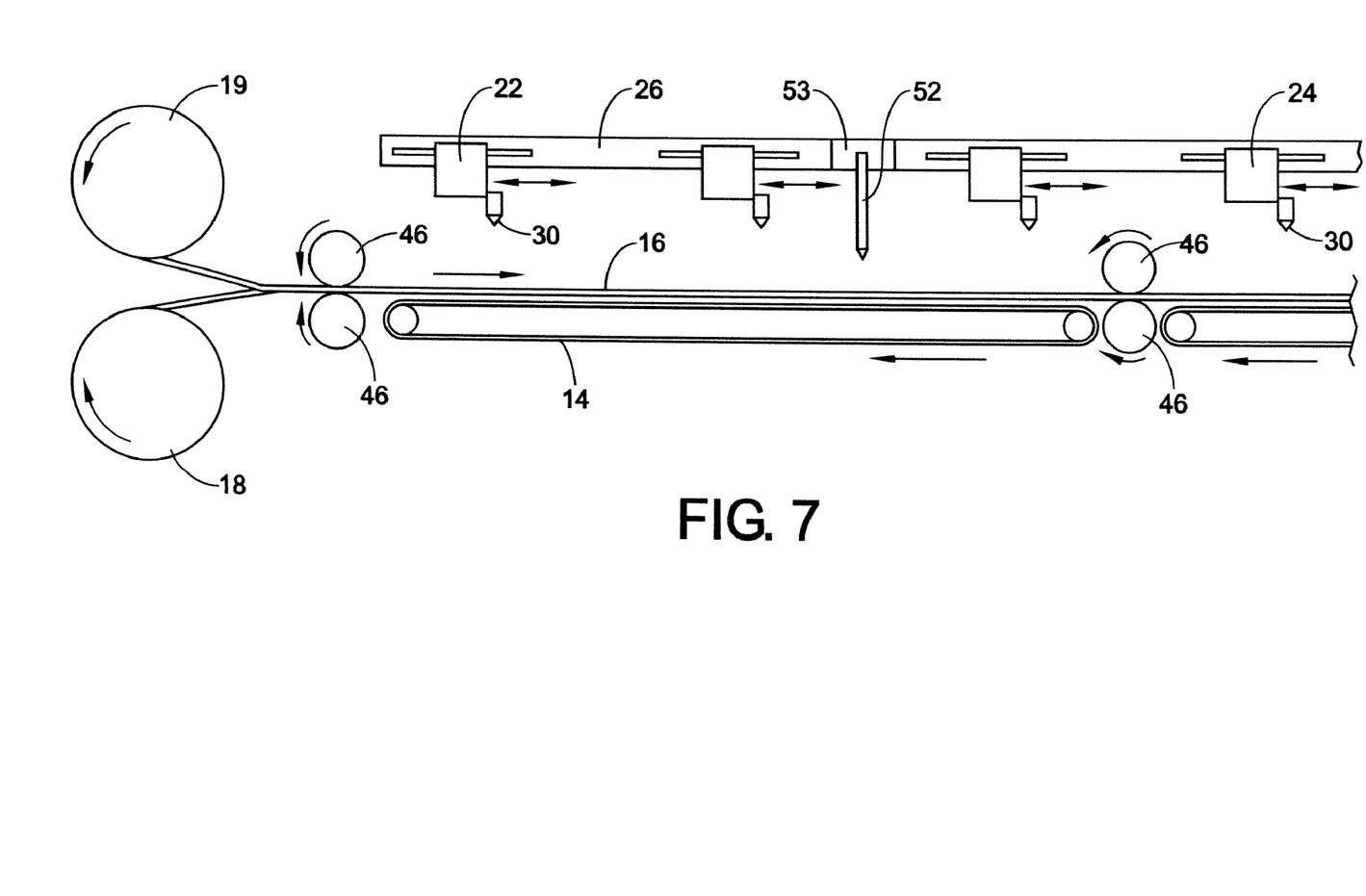
FIG. 7 is a side view of the laser blanking device shown in FIG. 2.

FIGS. 2 and 7 shows the gantry channels 28 formed along limited lengths of the parallel supports 26; however, the channels do not have to limit movement of gantries to any one designated cell. FIG. 3 shows an embodiment of the laser blanking device 10, wherein each of the gantries 22, 24 are capable of traveling an entire length of the conveyor line. In other words, the gantry channel 28 for which each the gantries 22, 24 travels extend an entire length of the parallel supports 26. The gantries 22, 24 can share a common channel (channel not visible in, but formed on, an undersurface of the parallel supports in FIG. 3), in which case the controller assigns each gantry a specific cutting profile that avoids collisions with the other gantries. The cutting profiles are divided between gantries 22, 24 in a manner that situates no two gantries at the same place at the same time during operation.

At least one moveable laser head 30 (hereinafter also synonymously referred to as "laser" and "laser cutter") is suspended from each of the gantries 22, 24. Each of the lasers' heads 30 travels along at least a portion of a longitudinal length of the corresponding gantry 22, 24. The longitudinal axis of the gantry is essentially a lateral axis 27, which is transverse to the longitudinal axis 13 of the device 10. The laser head 30 is received in and travels back-and-forth along a laser channel 32 which is formed in a surface extending along a side or an underside surface of the corresponding gantry 22 or 24. Each of the gantries 22, 24 may suspend multiple laser heads 30, wherein each laser head can travel a limited or an entire length of the corresponding or shared laser channel 32. The cutting profiles can be divided between laser heads in a manner that situates no two lasers in the same place on a common gantry at the same time.

Essentially, the laser beam path can operate in the following multiple axes when the laser 30 moves in conjunction with the corresponding, moving gantry 22, 24: (1) longitudinal movement in a first axis by means of the gantry traveling along the longitudinal axis 13 of the conveyor line; (2) lateral movement in a second axis by means of the laser head traveling along the longitudinal axis 27 of the corresponding gantry 22, 24; and, (3) vertical movement in a third axis by means of the laser head lowering and raising in relation to the gantry-support.

One laser moves along a longitudinal axis 27 of one of the gantries while another laser moves along a longitudinal axis of another gantry. In this manner, the laser blanking device 10 is capable of performing synchronized movements of each of the laser heads 30 and the gantries 22, 24 on the continuously moving strip 16 of material. An aspect of the present conveyor system 10 is that it can concentrate the work performed on each section 33 (shown in phantom in FIG. 2) of strip 16 material into at least two smaller areas 34 (shown in phantom in FIG. 2). Each of the laser heads can make a partial or a complete cut of the material as it passes under the laser head 30. Thus, the laser heads 30 each progressively cut the perimeters of cut-outs 20, 220, 221 and/or blanks 200 from the moving strip 16 in multiple stages. The laser beam path of each laser head 30 is thereby minimized so that the cutting time is dramatically reduced.

Each of the laser heads 30 cuts a perimeter portion of the blank 200 or a cut-out 20, 220, 221 therefrom as the strip 16 moves past the corresponding gantry 22, 24. A first laser 30 initially pierces the strip of material 16 and starts to cut the perimeter portion 36 of the cut-out 20, 220, 221 or a perimeter 201 (FIG. 3) of the blank 200. A subsequent laser 30 in sequence (such as a second or third laser) then continues the cut of the perimeter portion where the first laser finished cutting. Since the first and subsequent lasers 30 are capable of cutting limited portions of the strip 16 material, an uncut length of material or gap exists between opposite terminal ends 38 of the profile's perimeter. The gap or length between ends 38 shortens with each subsequent laser cut, but the blank essentially remains connected to the strip 16 until the final cut is made by the last laser 30 in the cutting sequence. One of the laser heads 30 on the second gantry 24 completes the entire perimeter 203 of the blank's profile by cutting the section of material away from the strip to separate the blank 200 therefrom (as shown in FIG. 3); hence, no portion of the blank 200 remains attached to the strip 16, and the blank is completely disconnected and removed from the strip for appropriate stacking. The laser head which completes an entire perimeter of any cut-out 20, 220, 221 profile, to sever the scrap from the strip 16, can be supported on a gantry situated either before (as shown in FIG. 3) or after (as shown in FIG. 2) the second pin roll assembly 42.

The conveyor system 10 integrates movements of a plurality of lasers 30 and gantries 22, 24 with the pin conveyor 14. Each laser head 30 is associated with a specific cutting stage or a specific step in cutting a developed blank shape 200 or cut-out part 20, 220, 221 from material. The laser 30 movement along the longitudinal axis 27 of the gantry 22, 24 and the gantry's movement along the longitudinal axis 13 of the device are coordinated with the longitudinal movement of the pin conveyor 14, which moves the strip 16 of material at a (constant) velocity (for example, 150 feet/minute or 50 meters/minute or more). Movement of the lasers 30 and the gantries 22, 24 are synchronized to make progressive cuts in the strip 16 while the strip travels at a velocity along the conveyor system. It is anticipated, for example, that the gantries 22, 24 (and the lasers) are each capable of moving at velocities up to at least two-times as much (i.e., 100 meters/minute) as the velocity at which the pin conveyor 14 moves. That is, since the laser could be moving at twice the speed of the strip, the laser would effectively be moving at 50 m/minute with respect to the moving strip. Similarly, the laser heads 30 are capable of moving along the gantry 22, 24, in either longitudinal 27 and/or vertical axes, at rapid velocities. There is no specific limitation made herein to a maximum velocity of movement for any of the pin conveyor 12, the gantries 22, 24, the laser heads 30, and later described pinch rollers 46; rather, the disclosure herein is capable of being utilized with technologies and various speeds of movement.

The conveyor system 10 further comprises at least two pinch roll assemblies 40, 42 which assist in the movement of the strip 16 along the pin conveyor 14. These pinch roll assemblies can be included on and supported by the conveyor support frame 12 (as shown in FIG. 2) or it can be a stand-alone apparatus situated in alignment with the conveyor support frame (as shown in FIG. 4). An entry pinch roll assembly 40 is located at or just immediate the first end 15 of the conveyor support frame 12. This entry pinch roll assembly 40 pulls on the coil stock 18 to feed the strip 16 of material onto the pin conveyor 14. A motor 975 (FIG. 3) or other auxiliary coil processing equipment assists in rotating a reel 44 of the coil stock so that the outermost layer of the strip 16 can be continuously transported from the coil stock 18 to the pin conveyor 14. This auxiliary equipment more specifically actuates a mechanical rotation of the reel 44 about which the coil stock is wound.

A second pinch roll assembly 42 is located at or near the second opposed end 17 of the conveyor support frame 12. The second pinch roll assembly 42 pulls on the strip 16 to deliver it to auxiliary equipment positioned downstream of the pin conveyor 14. The pinch roll assemblies 40, 42 both include a pair of parallel, opposed pinch rollers 46 through which the strip is fed. One of the pinch rollers 46 extends across the strip's 16 upper surface while a second pinch roller extends across the strip's lower surface.

Figure 5:
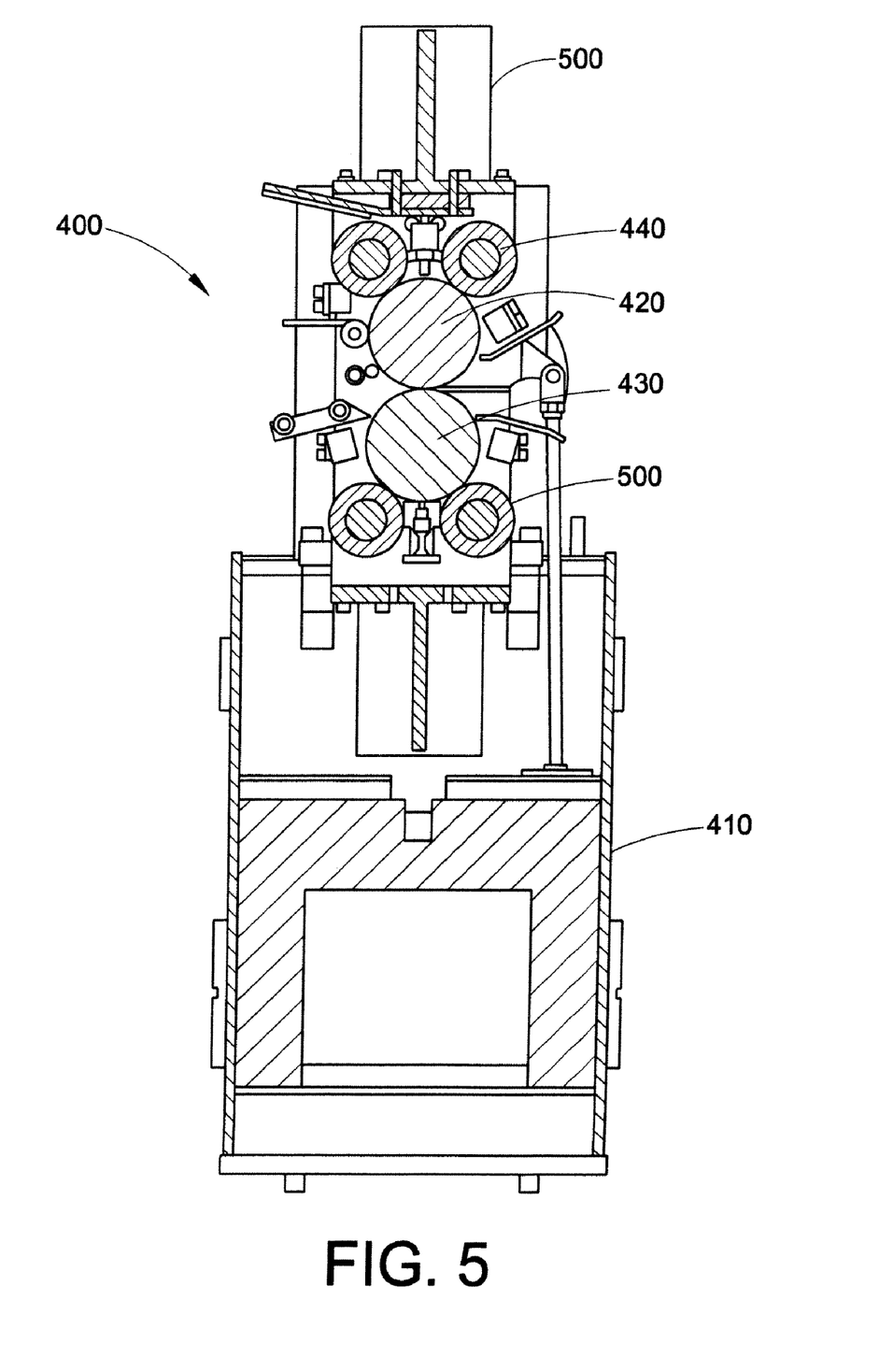
FIG. 5 is a side view of a pinch roll assembly included in the progressive laser blanking device.

FIG. 5 shows a detailed side view of a pinch roll assembly 400 which includes a pinch roll frame 410 that supports the adjacent surfaces of upper and lower pinch rollers 420, 430 at a height substantially equivalent to the height of the pin conveyor. The pinch roll assembly 400 situates the upper pinch roller 420 in (approximately) a same vertical plane as the lower pinch roller 430. Above and below the respective upper and lower pinch rollers 420, 430 are upper and lower back-up pinch rollers 440, 450.

Figure 6:
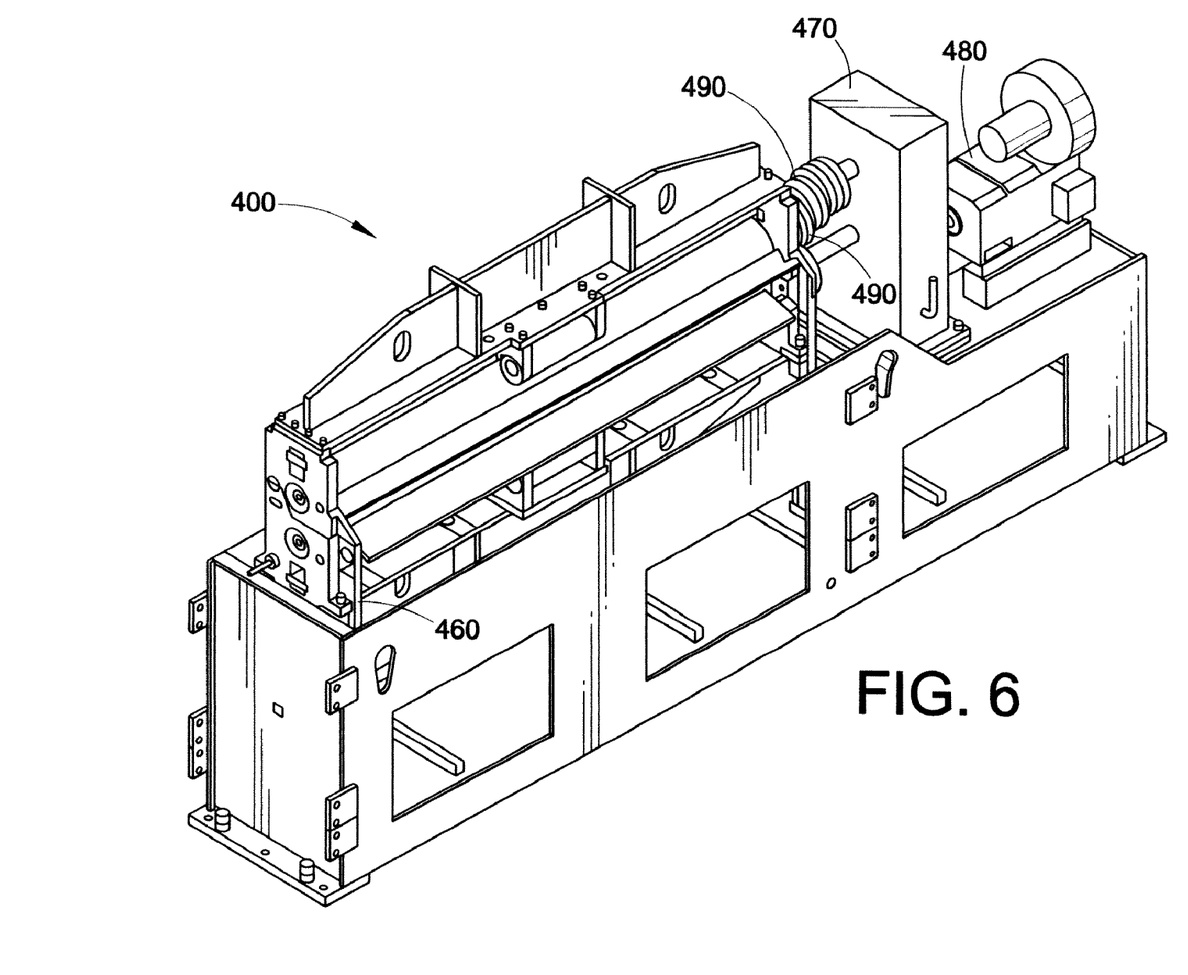
FIG. 6 is a perspective view of the pinch roll assembly shown in FIG. 5.

The pinch roll assembly 400 is shown in FIGS. 5 and 6 to include the pair of pinch rollers 420, 430 supported on a pinch roller cylinder 460. It is anticipated that the pinch roll assemblies 400 can utilize systems commonly known in the art, and that they function by means of existing components, such as, for examples upper and lower bridges 500. For example each of the pinch roll assemblies 400 utilize a gear box 470 and a motor 480 to drive a rotation of each pinch roller 46. Each of the pinch rollers 420, 430 couples to the gear box 470 by means of a pinch roller coupling 490, which can act as a rotating shaft.

A length of each pinch roller 46 is at least equal to or greater than a width of the strip 16. This length is necessary to ensure that the pair of pinch rollers 46 effectively capture and apply force to the entire width of the strip 16 as it passes between the rollers. Tension is pulled between the pinch roll assemblies 40, 42. This tension helps prevent sag in the strip 16, which is typically induced by both the strip's weight and the distance between opposite ends of the pin conveyor 18. For longer conveyor support frames 12, at least a third, intermediate pinch roll assembly (not shown) with a set of pinch rollers can be situated between the entry and the second pinch roll assemblies 40, 42 to further reduce sag in the strip 16.

A second function of the pinch rollers 46 is to assist forward movement of the strip 16 on the production line. Each of the pair of pinch rollers 46 rotate at a velocity substantially equal to a velocity of travel (that is, up to 150 feet/minute or 50 meters/minute or more) of the pin conveyor 14; however, each pinch roller in the pair of rollers rotates in opposing clockwise and counter-clockwise directions along the rollers' longitudinal axis with respect to the other.

There are strategic stages or cells of laser cutting established so that the final parting or cutting of a profile of a blank's 200 perimeter is not performed until the strip 16 moves past the second pinch roll assembly 42. The strip 16 is kept in tack or in one piece, i.e., the blank 200 remains attached thereto, in the areas between the entry pinch roll assembly 40 and the second pinch roll assembly 42. For this reason, a first gantry 22 is situated between the entry pinch roll assembly 40 and the second pinch roll assembly 42. A second gantry 24 is situated beyond the second pinch roll assembly 42. The laser cutting device 10 can further include at least a third gantry 23 positioned in any location between or in front of or behind the gantries 22, 24. The laser head(s) 30 that is suspended from the second gantry 24, i.e., the final gantry in the cutting sequence, completely severs or removes the blank 200 from the strip 16.

The foregoing procedure is best illustrated in FIG. 3. FIG. 3 illustrates a developed blank 200, which includes both a peripheral, triangular scrap shapes 202 and an interior circular or round scrap shape 204 cut therein. Other blank shapes and scrap shapes are also contemplated by the disclosure. The developed end blank 200 is a polygonal shape including a circular hole 206 through its center. The blank 200 is severed from a neighboring section 233 of strip 16 by the last laser 232 after the second, last pinch roll assembly 42. The intermediate lasers 230 cut the partial portions of the profile of the end blank's 200 shape by cutting off cut-outs 220, 221.

In the present production line, the scrap parts 220, 221 continue to travel along the pin conveyor 14 until they can fall away from the strip 16 and into a scrap conveyor 48 positioned adjacent to and below the conveyor line. The scrap conveyor 48 transports the discarded cut-outs 20 (FIG. 2), 220, 221 (FIG. 3) to a disposal bin 50 (FIG. 2). FIGS. 1-4 show a scrap conveyor 48 situated in a horizontal plane below the pin conveyor 14. In this manner, the discarded scrap part 20, 220, 221 can drop or fall from the strip, where it is carried away by the scrap belt conveyor. An off-line robot (not shown) can alternatively remove the scrap part 20 away from the strip 16.

Figure 8:
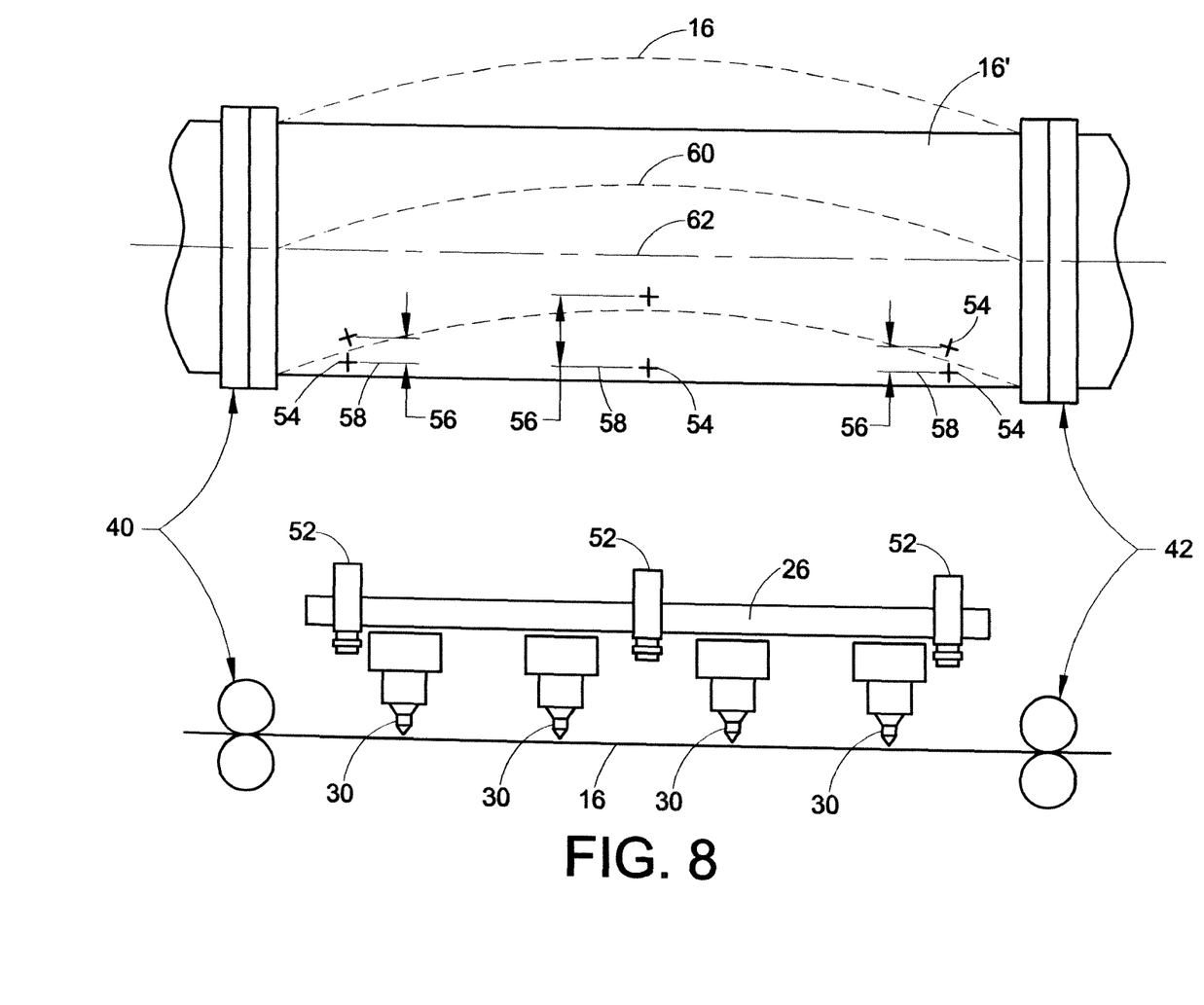
FIG. 8 is a top view and side elevational view of a moving strip of material with camber and an in-line inspection system.

An additional feature of the laser cutting device 10 is an in-line inspection system which measures a distance between a centerline of the pin conveyor 14 and a strategic registration mark 54 placed on the strip 16. Oftentimes, strips 16 of material have camber; that is, the strip shifts laterally at some point during travel along the longitudinal axis 13 of the device. Such camber is illustrated in FIG. 8, wherein camber is shown in a strip 16 superimposed over a correctly traveling linear strip 16' (in phantom). The strip 16 may move laterally a few millimeters off of the centerline of the conveyor such that the strip's centerline no longer coincides with a centerline of the pin conveyor 14. It is also not uncommon for a position of the strip 16 to first shift away from the centerline of the pin conveyor 14 but to then return to the centerline as it travels along the longitudinal axis 13. The in-line inspection system serves to accommodate these undesired offsets.

One way in which the in-line inspection system can sense any shifts in the strip 16 is shown in FIG. 7. At least one visual inspection system (hereinafter synonymous to "visual inspection sensor" and "visual inspection camera") 52 is suspended from a beam 53 that extends along a transverse axis with respect to the horizontal supports 26. The in-line inspection system uses an associated controller (not shown) to calculate and to make adjustments to the assigned movements of both gantries 22, 24 and laser head 30 based on a measured lateral undesired movement of the strip 16. The in-line inspection system measures the dimensional difference between the centerline of the cambered strip 60 and the centerline of the laser cutting system 62 (which coincides with the centerline of a correctly traveling strip). The dimensional difference is then sent back to the system control, and the cutting routines of each of the laser heads 30 are adjusted in order to create the identical finished blank, regardless of the size of the dimensional difference.

Essentially, the sensor 52 determines the amount of camber in the strip 16, and the laser cutting device 10 makes real-time, continuous adjustments in the gantries' and lasers' motion profiles. These adjustments are calculated and communicated to the controller, which then directs both the lasers 30 and the gantries 22, 24 to make real-time alterations in their movements to correct for the varying amounts of camber. The laser positioning system compensates for irregularities in the camber of the strip 16. There is no limitation made herein to the range of camber in which the in-line inspection system actuates adjustments; however, it is anticipated that the laser cutting device is capable of making cutting adjustments for at least 0-50 mm camber.

FIG. 8 illustrates an example of camber in the strip, which is exaggerated for purposes of illustration. The strip 16 includes the registration marks 54 at strategic locations thereon, which are most preferably marked in places that will be scrapped. Each instance the visual inspection sensor 52 reads a registration mark 54, it actuates the sensor 52 to take an overhead photograph of that section of strip 16 passing there under. A measurement is computed from that photograph, which computation is more specifically a delta or distance 56 (in the range of 0 to 50 mm or more) between the centerline 58 of the laser blanking device and the centerline 58 of the cambered strip 16'. Pictorial algorithms evaluate the rapid photographs, and the difference in the distances measured is communicated to the controller. The controller utilizes those measurements to adjust the cutting paths.

A further feature of the laser cutting device 10 is a coil mapping system. The coil mapping system tracks defects in the coil of material based on previously entered defect coordinates. Oftentimes, an end-user will accept a coil knowing that the coil has defects in it in exchange for a discount from a coil supplier. Portions of the strip 16 with defects cannot be used. The coil mapping system allows the production line to determine when defective areas of the strip are being processed by the laser blanking system 10. The coil mapping system tracks the defective regions of the strip 16 so that an auxiliary end stacker (not shown) can separate and reject parts produced from material in those defect coordinates. One aspect of the coil mapping system is that it saves the costs associated with visual inspections of parts at an end of the process. Another aspect of the coil mapping system is that it allows defective coils to be processed and used, which would have been rejected by many end-users utilizing existing blanking production lines.

A central controller communicates with the gantries 22, 24, the laser heads 30, the belt conveyor 14, and the pinch rollers 46 to synchronize movements of each based on downloaded computer-aided-design data specific to the perimeter formed. The controller, or a program communicating thereto, produces operating parameters which optimize a distribution of the perimeter cutting and laser beam path requirements among the lasers 30. The laser blanking system 10 is also capable of using the computer-aided-design information to develop laser cutting paths that will produce parts from the strip 16 material which were scrapped in previous applications. Essentially, the outer regions of material leftover between blanks can be utilized to produce either similar or dissimilar parts. This capability to utilize additional material minimizes scrap without slowing production rates.

Multiple laser heads 30 can be supported on any one gantry 22, 24. For a gantry including multiple lasers 30, a first laser is used to cut a first perimeter profile while a second laser, situated on the same gantry, is used on the same strip section 33 to cut a second perimeter profile independent of the first perimeter profile. Alternatively, both laser heads can operate on different portions of the same perimeter profile as the section 33 of strip 16 passes under the corresponding gantry 22, 24. The laser movements and laser paths are restricted to different portions 34 of the same section of strip; however, two lasers can operate in the same cross-sectional area if they are cantilevered.

Furthermore, the controller can process two-dimension CAD files in multiple formats, which automatically determines a width of the strip that should be used in order to minimize the scrap material generated from the laser blanking process. In many circumstances, the scrap can be significantly lower than the scrap resulting from comparable, traditional systems. The controller determines the best nesting arrangement for producing a maximum number of parts while minimizing scrap. The CAD data is translated into CNC machine tool code. There are several common formats in which the machine tool code can be provided. The controller then processes the machine tool code and divides the machine tool code between each of the lasers 30 on the line. Several algorithms are used to determine the initial laser head work load. A CAD file is produced for the cutting routine of each of the laser's work load; manual adjustments of the work load can be made from any tow-dimensional CAD station.

The disclosure contemplates that associated mechanical actuators and electrical control systems are further utilized to support gantry 22, 24 and laser 30 movements on the conveyor system 10. The laser blanking device 10 is capable of utilizing any of a variety of well known lasers, such as remote laser optics, fiber lasers, thin-disk lasers, etc, or any other laser capable of cutting at a rate that can sustain the velocity of the pin conveyor 14. Utilizing existing laser technology, it is contemplated that the conveyor system 10 is capable of moving strip at a minimum of 40-80 meters per minute.

Another feature of the present disclosure is a welding station (not shown) where two or more strips pulled from different coil stocks are welded or joined together prior to their entry into the first pinch roll assembly 42. Currently, some manufacturers produce coil lines which were at one-time two coils, but coils were welded side-by-side and rewound on a new reel. The present production line is capable of eliminating the steps of rewinding the welded coils onto new reels. Essentially, referring to FIG. 2, the laser blanking device 10 processes strips 16 pulled from two vertically offset coils 18, 19 wherein a welding station (not shown) welds them just prior to their being fed into the entry pinch roll assembly 40. The strips 16 can vary in thickness, widths, or grade and the lasers are set to accommodate the varying thickness in the welded strips. Each of the strips welded from the two coils combine to form a new strip of greater width.

FIGS. 9 and 10 show an alternate embodiment of the laser cutting device 10. The alternate embodiment can include at least one or a plurality of stand-alone subassemblies or cells 300 capable of being aligned along an axis, such as between opposite sets of pinch rollers, or after a pinch roll assembly. Each cell 300 includes a pin conveyor 305 that moves a support frame 310. Each cell 300 supports at least one laser head 330 on a gantry 325 that extends outward from one or both of parallel support bars 315. An advantage to the cells 300 embodiment is that the laser cutting device 10 can be lengthened for longer strips or to produce more cuts, or it can be shortened for operations that require very few cuts. In other words, the cell embodiment 300 is capable of adjusting a length of the laser cutting device 10 with respect to the parameters of each individual operation. One such cell 300 is included in FIGS. 3 and 4 at a second end 17 of the laser cutting device 10. This cell 300 is situated just after the second pinch roll assembly 42.

Figure 11:
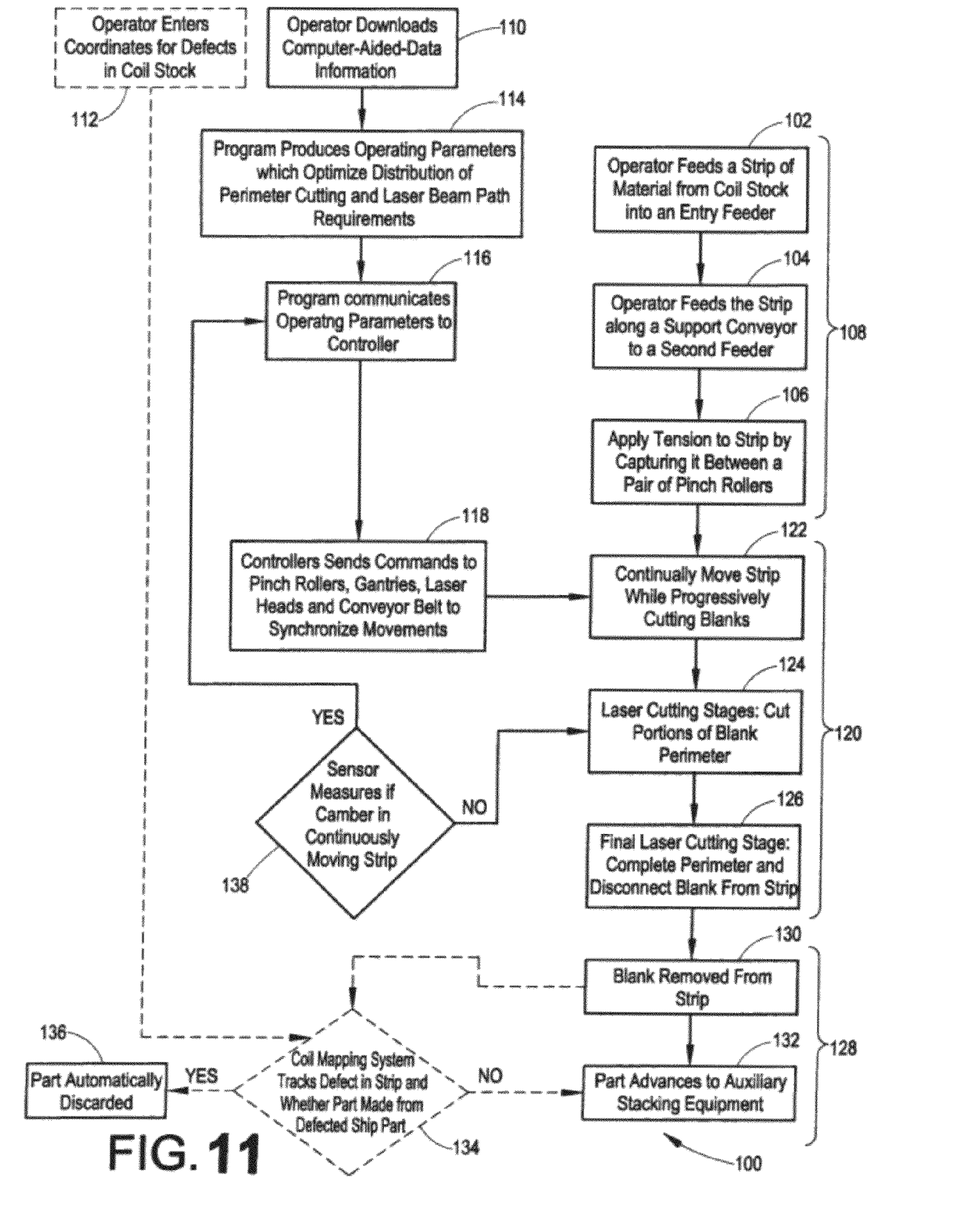
FIG. 11 is a schematic view of a method of progressive laser blanking for high speed cutting of strips of material.

FIG. 11 illustrates an exemplary method 100 of progressive laser blanking for high speed cutting of coil strip material. While the method 100 and other methods of the disclosure are illustrated and described hereinafter as a series of acts or events, it will be appreciated that the various methods of the disclosure are not limited by the illustrated sequence of such acts or events. In this regard, some acts or events may occur in different orders and/or concurrently with other acts or events apart from those illustrated and described herein, in accordance with the disclosure. It is further noted that not all illustrated steps may be required to implement a process in accordance with the present disclosure. The methods of the disclosure, moreover, may be implemented in association with the illustrated production line equipment as well as with other apparatus, e.g., existing apparatus, not illustrated or described, wherein all such alternatives are contemplated as falling within the scope of the invention and the appended claims. As an example, the method 100 of FIG. 11 may be implemented in the laser blanking system 10 of FIGS. 1-4 for progressive high speed cutting of rapidly fed coil stock material.

Referring to the flow chart of FIG. 11, the method 100 begins at step 102, wherein an operator threads a leading edge of a strip of material from a coil stock into an entry pinch roll assembly (e.g., entry pinch roll assembly 40 in FIG. 1). This strip of coil stock can by manually or automatically fed into the entry pinch roll assembly. Similarly, welded strips of coil stocks can be fed in the entry pinch roll assembly. For step 104, the operator pulls the leading edge of the strip to the second pinch roll assembly (e.g., second pinch roll assembly 42 in FIG. 1). In the next step 106, the operator applies tension to the strip by feeding it between pairs of pinch rollers (e.g., pinch rollers 420, 430 in FIGS. 5 and 6) at both pinch roll assemblies.

The foregoing steps 102, 104, 106 are collectively referred to as preparatory or preprocessing steps 108. Before initiating the process, which utilizes the laser blanking device 10 of FIGS. 1-4, the operator performs step 110 to download computer-aided-design information specific to the part being produced. If the coil stock material used for the particular process has a defect, the operator pre-enters the coordinates for defects in the coil stock in step 112. The program utilizes the downloaded information to calculate and to produce operating parameters, in step 114, that optimize the distribution of both the blank's perimeter cutting and its laser beam path requirements. The program communicates the selected operating parameters to a controller in step 116. The controller sends commands in step 118 to the pinch rollers (e.g., pinch rollers 420, 430 in FIGS. 5 and 6), to gantries (e.g., gantries 22, 24 in FIGS. 1-4), and to laser heads (e.g., laser heads 30 in FIGS. 1-4) to synchronize their movements to coordinate with a velocity of a moving pin conveyor (e.g., pin conveyor 14 in FIG. 1).

Cutting stages are collectively referred to as step 120. All stages of cutting the strip are performed while the pin conveyor continuously moves at a constant velocity. Once the step 106 of applying tension to the strip occurs, the pinch rollers rotate to continuously feed the strip material in step 122. The laser(s) of a first in at least two gantries pierces the strip material and cuts a portion of a blank's perimeter, as shown in step 124. This first gantry is situated between the entry and the second pinch roll assemblies. Any stage of cutting between the entry and the second pinch roll assemblies does not result in the blank being completely disconnected from the strip. A final laser cutting step 126 occurs after the strip moves past the second pinch roll assembly. In the final laser cutting step 126, the laser head(s) of the second gantry (e.g., gantry 24 of FIGS. 1-40) complete the cutting of the blank, which results in the blank being removed or completely disconnected from the strip.

The next steps in the sequence of method 100 are collectively referred to as post-laser cutting steps 128. The blank that was cut from the strip is removed as scrap in step 130. The remaining part of the strip advances to auxiliary stacking equipment in step 132; however, if the operator pre-entered defect coordinates in step 112, a coil mapping step 134 will track progress of the strip sections corresponding to the coordinates as the strip moves along the production line. If the produced part originated from a section of material corresponds with the defect coordinates, then auxiliary equipment actuate in response to commands, in step 136, to automatically discard it. However, if the produced part originated from a section of material does not correspond to defect coordinates, the produced part advances to auxiliary stacking equipment (shown as step 136).

The method 100 can further include in-line inspection step 138. A sensor measures any lateral shift of the strip by measuring the distance between a centerline of the pin conveyor 14 and a strategic registration mark placed on the strip 16. The in-line inspection step 138 sends any measurement of offset to the program controller, which recalculates the operating parameters of step 114. The real-time adjustments are communicated to the controller, which commands, in step 118, altered movements of the laser beams and the gantries to compensate for the varying amounts of camber.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A laser blanking device for cutting rapidly fed coil stock material, the device comprising: a support frame extending from a first end to a second end along a first longitudinal axis; a conveyor supported by the support frame moving in a forward direction from the first end to the second end, the conveyor supporting a strip of coil stock material; a first pinch roll assembly located adjacent to the first end, the first pinch roll assembly feeding a strip of coil stock material in the forward direction from an associated coil onto the conveyor; at least two gantries supported above the conveyor, each gantry having a second longitudinal axis that is generally transverse to the first longitudinal axis; at least one laser head suspended from each gantry, each laser head moveable along the second longitudinal axis; a second pinch roll assembly located adjacent to the second end, the second pinch roll assembly assisting the movement of the strip of coil stock material in the forward direction; wherein the device performs multiple laser cutting operations simultaneously on the strip of coil stock material as the strip of coil stock material moves along the longitudinal axis of the device; and wherein a first gantry of the at least two gantries is located between the first pinch roll assembly and the second pinch roll assembly, and a second gantry of the at least two gantries is located between the second pinch roll assembly and the second end, the laser head suspended from the second gantry completing a cut through the strip of coil stock material that separates a portion of the strip of coil stock material from the remainder of the strip of coil stock material.

2. The laser blanking device of claim 1 wherein the portion of the strip of coil stock material comprises one of a blank and a piece of scrap.

3. The laser blanking device of claim 1, wherein the first and second pinch roll assemblies move the strip of coil stock material in the forward direction at a velocity substantially the same as a velocity of the conveyor.

4. The laser blanking device of claim 3, wherein the first and second pinch roll assemblies apply tension to the strip of coil stock material in a direction of the first longitudinal axis.

5. The laser blanking device of claim 4, wherein each of the first and second pinch rollers has a length that extends at least a width of the strip of coil stock material.

6. The laser blanking device of claim 1 wherein each gantry is moveable along the first longitudinal axis.

7. The laser blanking device of claim 1, wherein each laser head comprises a laser that cuts a perimeter portion of a blank from the strip of coil stock material as the strip of coil stock material moves past the laser head;
and wherein the laser cuts the strip of coil stock material without ceasing movement of the conveyor.

8. The laser blanking device of claim 1, wherein the conveyor comprises a plurality of arms having pins thereon for supporting the strip of coil stock material.

9. The laser blanking device of claim 1 further comprising an in-line inspection system for measuring a distance between a centerline of the conveyor and a registration mark on the strip of coil stock material, the in-line inspection system comprising a controller for calculating adjustments to the movements of the at least two gantries and the at least one moveable laser head based on a measured camber in the strip of coil stock material.

10. The laser blanking device of claim 1 further comprising a coil mapping system, the coil mapping system tracking defects in the coil based on defect coordinates of the strip of coil stock material, the coil mapping system comprising a controller for causing a stacker to reject portions of the strip of coil stock material that are associated with the defect coordinates.

11. The laser blanking device of claim 1, further comprising:
   a second conveyor support frame extending from a third end to a fourth end along a third longitudinal axis, the second conveyor support frame located adjacent to the conveyor support frame and aligned such that the first longitudinal axis and the third longitudinal axis form an angle greater than or equal to 0 degrees and less than or equal to 90 degrees; and
   a second conveyor supported by the second conveyor support frame and moving in a recurring loop in a direction from the third end to the fourth end, the second conveyor transporting a portion of the strip of coil stock material that has been separated from the remainder of the strip of coil stock material.

12. The laser blanking device of claim 11 wherein the second conveyor is supported below the conveyor.

13. A progressive laser blanking device for high-speed cutting of coil stock material, the device comprising:
   a first support frame extending from a first end to a second end along a first longitudinal axis;
   a first conveyor supported by the first support frame and moving in a recurring loop in a forward direction between the first end and the second end, the first conveyor supporting a strip of coil stock material;
   a first pinch roll assembly located adjacent to the first end, the first pinch roll assembly feeding a strip of coil stock material in the forward direction from an associated coil onto the first conveyor;
   at least one first gantry supported above the first conveyor, each first gantry located between the first end and the second end, each first gantry having a second longitudinal axis that is transverse to the first longitudinal axis;
   at least one first laser head suspended from each first gantry, each first laser head moveable along the second longitudinal axis;
   a second support frame extending from a third end to a fourth end along a third longitudinal axis, the second support frame located adjacent to the second end of first support frame and aligned with the first support frame such that the first longitudinal axis and the third longitudinal axis are substantially collinear;
   a second conveyor supported by the second support frame and moving in a recurring loop in a forward direction between the third end and the fourth end, the second conveyor supporting the strip of coil stock material;
   a second pinch roll assembly located adjacent to the third end, the second pinch roll assembly assisting the movement of the strip of coil stock material in the forward direction from the first conveyor to the second conveyor;
   a second gantry supported above the second conveyor, the second gantry located on a forward side of the second pinch roll assembly, the second gantry having a fourth longitudinal axis that is transverse to the third longitudinal axis;
   a second laser head suspended from the second gantry moveable along the fourth longitudinal axis, the second laser head completing a cut separating a portion of the strip of coil stock material from the remainder of the strip of coil stock material.

14. The progressive laser blanking device of claim 13, further comprising:
   a third conveyor support frame extending from a fifth end to a sixth end along a fifth longitudinal axis, the third conveyor support frame located adjacent to one of the first conveyor support frame and second conveyor support frame and aligned such that the first longitudinal axis and the fifth longitudinal axis form an angle greater than or equal to 0 degrees and less than or equal to 90 degrees;
   a third conveyor supported by the third conveyor support frame and moving in a recurring loop in a direction from the fifth end to the sixth end, the third conveyor transporting a portion of the strip of coil stock material that has been separated from the remainder of the strip of coil stock material.

15. The progressive laser blanking device of claim 14 wherein the third conveyor is supported below one of the first conveyor and the second conveyor.

16. The progressive laser blanking device of claim 13 wherein each first gantry is moveable along the first longitudinal axis.

17. The progressive laser blanking device of claim 16 wherein each second gantry is moveable along the third longitudinal axis.

18. A laser blanking device for cutting rapidly fed coil stock material, the device comprising: a conveyor extending along a first longitudinal axis from a first end to a second end, the conveyor supporting a strip of coil stock material while the strip of coil stock material moves along the first longitudinal axis in a forward direction from the first end to the second end; a first pinch roll assembly located adjacent to the first end, the first pinch roll assembly feeding a strip of coil stock material in the forward direction from an associated coil onto the conveyor; at least two gantries supported above the conveyor, each gantry having a second longitudinal axis that forms an angle greater than 0 degrees and less than or equal to 90 degrees with the first longitudinal axis; at least one laser head suspended from each gantry, each laser head moveable along the second longitudinal axis; a second pinch roll assembly located toward the second end, the second pinch roll assembly assisting the movement of the strip of coil stock material in the forward direction; wherein the first and second pinch roll assemblies apply tension to the strip of coil stock material in a direction of the first longitudinal axis; wherein the device performs multiple laser cutting operations simultaneously on the strip of coil stock material as the strip of coil stock material moves along the longitudinal axis of the device; and wherein a first gantry of the at least two gantries is located intermediate the first pinch roll assembly and the second pinch roll assembly, and a second gantry of the at least two gantries is located between the second pinch roll assembly and the second end, the laser head suspended from the second gantry completing a cut through the strip of coil stock material that separates a portion of the strip of coil stock material from the remainder of the strip of coil stock material.

19. The laser blanking device of claim 18, wherein at least one gantry is moveable along the first longitudinal axis.

* * * * *